June 19, 1962 — W. H. RUCKS — 3,039,486
CONTROL VALVE ASSEMBLY
Filed Oct. 9, 1957 — 2 Sheets-Sheet 1

FIG. I.

INVENTOR.
WALTER H. RUCKS
BY
his ATTORNEYS.

United States Patent Office 3,039,486
Patented June 19, 1962

3,039,486
CONTROL VALVE ASSEMBLY
Walter H. Rucks, Islip, N.Y., assignor to Fairchild Stratos
Corporation, a corporation of Maryland
Filed Oct. 9, 1957, Ser. No. 689,230
4 Claims. (Cl. 137—489)

This invention relates to a control valve assembly which comprises a housing containing a passage therethrough which is adapted to be interposed in a fluid system, a control valve in the passage, a valve actuator for the regulation of said valve, and a dual sensing device which operates under predetermined conditions to influence the operation of the valve actuator.

The control valve of the present invention is particularly but not necessarily adapted to control the suction line pressure of a compressor, particularly a compressor which operates in conjunction with an evaporator unit. When utilized in this type of system, the control valve serves the dual purpose of limiting the compressor suction pressure during starting and excess load conditions and of regulating the evaporator pressure at loads which are less than the design load of the compressor.

Figure 1:
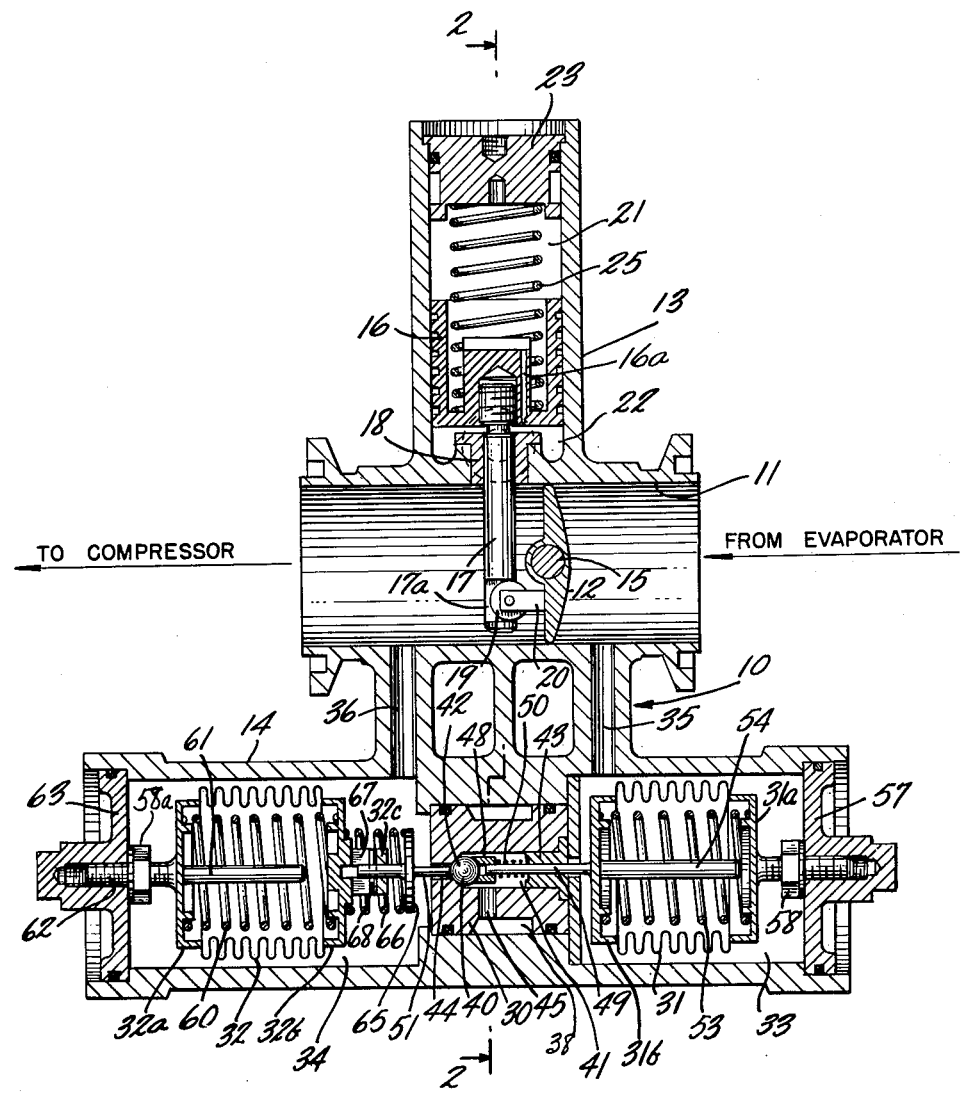
Figure 2:
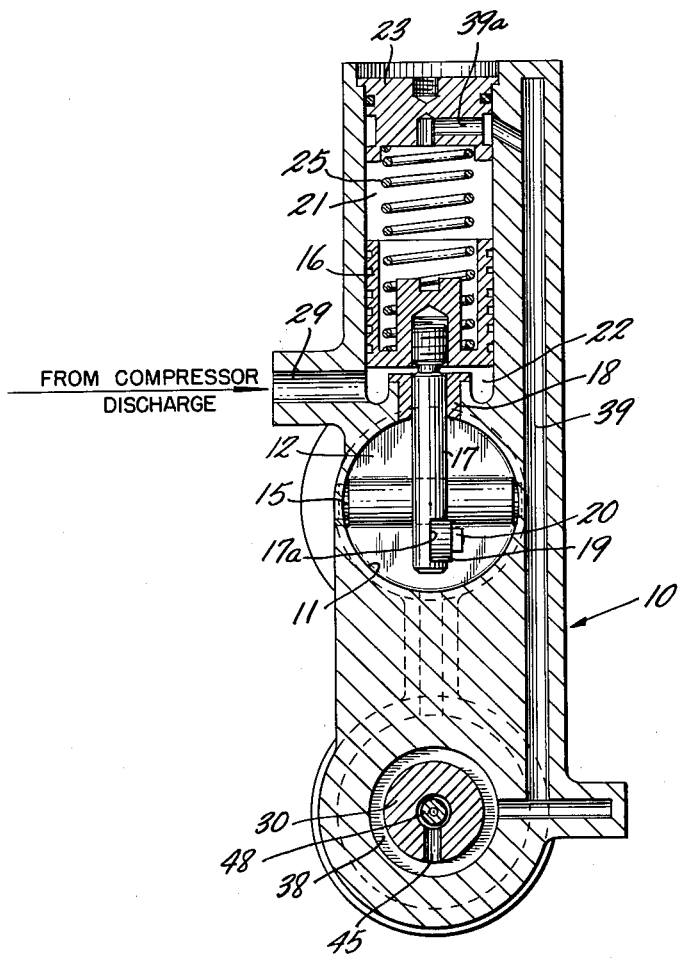

For a complete understanding of the present invention, reference may be made to the detailed description which follows and to the accompanying drawings, in which:

FIGURE 1 is an elevational view of the control valve assembly in cross-section; and FIGURE 2 is a cross-sectional view taken substantially along the line 2—2 of FIGURE 1, looking in the direction of the arrows.

Referring to the drawings, the control valve assembly of the present invention comprises generally a housing 10 through which is formed a passage 11, a butterfly valve 12 interposed in the passage 11 for regulating the flow of a fluid directed through the passage, a valve actuator which is accommodated within the upstanding portion 13 of the housing, and a dual sensing device which is accommodated within the lower portion 14 of the housing. The dual sensing device operates under predetermined conditions, explained in detail below, to influence the operation of the valve actuator.

The butterfly valve 12 is supported by and pivoted about the axis of a shaft 15 within the passage 11. The valve 12 is opened and closed by a valve actuator which, in the embodiment illustrated, is a movable piston 16 accommodated within the hollow bore of the upstanding portion 13 of the valve housing. The piston 16 is connected to the butterfly valve by a connecting rod 17. The upper end of the rod 17 is threadably coupled to the piston, and the lower end of the rod extends through a sealing bushing 18 into the interior of the passage 11. This lower end of the rod 17 is formed with a slot 17a which receives a roller 19 thereon. The roller 19, in turn, is supported from the downstream face of the valve by an arm 20. From the foregoing description it is apparent that as the piston 16 travels upwardly, the butterfly valve 12 is pivotally actuated thereby to open position, and as the piston 16 moves downwardly the butterfly valve is pivotally actuated thereby to closed position.

The piston 16 divides the hollow bore within the portion 13 of the housing into an upper chamber 21 and a lower chamber 22. The chamber 21 is defined between one side of the movable piston 16 and a plug 23 in the end of the boring through the portion 13 of the housing. The chamber 22 is defined between the opposite side of the piston and the sealing bushing 18 which is interposed between the passage 11 and the chamber 22. When the control valve is utilized in the system which will be described below, a compression spring 25 of the desired characteristics will be accommodated within the upper chamber 21. A restricted passage 16a is formed through the piston 16 to permit a slow seepage of the pressure between the high pressure chamber 22 to the normally low pressure chamber 21.

The dual sensing device, which is accommodated within the lower portion 14 of the housing, comprises generally a valve-retaining housing 30 and bellows-type actuators 31 and 32. The valve housing 30 is interposed between the bellows 31 and 32, and it divides the hollow interior of the housing 14 into chambers 33 and 34. The bellows actuator 31 is accommodated within the chamber 33, and the bellows actuator 32 is accommodated within the chamber 34. The chamber 33 communicates with the upstream side of the butterfly valve 12 through the passage 35, and the chamber 34 communicates with the downstream side of the valve 12 through the passage 36.

The valve housing 30 is formed with a groove or recess 38 about its outer periphery intermediate its ends. This groove or recess communicates with the chamber 21 of the valve actuator through a passage 39 (see FIGURE 2) which extends upwardly through the housing 10, and a passage 39a in series therewith which is formed in the plug 23. The valve housing 30 contains therein a ball-type pilot valve 40 which is accommodated within a valve chamber 41. The valve chamber 41 is defined between a valve seat 42 and a sealing plug 43. When the ball valve 40 is held against the valve seat 42, it closes a passage 44 which connects the chamber 34 with the valve chamber 41. The valve chamber 41, in turn, is connected to the groove or recess 38 by means of a radial passage 45 in the valve housing.

The ball valve 40 is held against the valve seat 42 by an annular element 48 which is slidably mounted on one end of a rod 49. The other end of the rod 49 is connected to the bellows 31. The annular element 48 is held against the ball valve by a small compression spring 50 interposed between the element 48 and the seal plug 43. The ball valve 40, however, is adapted to be moved away from the valve seat 42 by means of a plunger 51 which is connected to and controlled by the bellows 32 through a lost motion connection to be described below.

The bellows 31 has a fixed but adjustable end 31a and a movable end 31b, the two being connected by the collapsible and expandable bellows. The end 31b is urged away from the end 31a by the compressed spring 53 accommodated therebetween and within the bellows. A rod 54 is also interposed between the ends 31a and 31b of the bellows to limit the maximum compression or contraction of the bellows. One end of the rod 54 is connected to the end 31b of the bellows, and the other end is separated by a gap from the end 31a of the bellows. Therefore, when the pressure within the chamber 33 decreases, the bellows will expand, moving the plunger 49 to the left as viewed in FIGURE 1, and when the pressure within the chamber 33 increases, the bellows will contract to the extent permitted by the gap between the rod 54 and the end 31a, moving the plunger 49 to the right. The end 31a of the bellows is connected to a disk 57 which defines one end of the chamber 33 by means of a threaded shaft which is formed integrally at one end with the end piece 31a. This threaded connection permits the end piece 31a to be adjusted to the desired position within the chamber 33, and the tightening of the nut 58 carried on the threaded shaft permits the end piece 31a to be locked in the adjusted position.

The bellows 32 is constructed in substantially the same fashion as the bellows 31. More specifically, it has a fixed but adjustable end piece 32a and a movable end piece 32b connected by an expandable and contractible bellows. The interior of the bellows contains a compressed spring 60 which urges the end piece 32b away from the end piece 32a. A rod 61 is connected at one end to the end piece 32a and separated by a gap from the movable end piece 32b to limit the movement of the end piece 32b toward the end piece 32a. The end piece 32a is threadably coupled by means of a threaded shaft 62 to the disk 63 which defines one wall of the chamber 34 so as to permit the position of the end piece to be adjusted, and a nut 58a is carried on the shaft to make it possible to lock the end piece in locked position.

The movable end 32b of the bellows 32 carries an extension 32c having an axial bore therein which accommodates one end of the plunger 51 slidably therein. The plunger 51 carries a disk 65 intermediate its ends, and a compression spring 66 supported on the extension 32c between the end piece 32b and the disk 65 urges the plunger 51 toward the ball valve (or to the right, as viewed in FIGURE 1) to the extent permitted by the lost motion connection between the plunger 51 and the end piece 32b of the bellows. The lost motion connection comprises an axial slot 67 formed in the extension 32c in which a cross-pin 68 carried by the plunger 51 is accommodated. The plunger 51, therefore, is movable relatively to the end piece 32b of the bellows to the extent permitted by the ends of the slot 67. The spring 66, however, urges the plunger 51 away from the end piece 32b.

The operation of the control valve of the present invention will be described in its application as a suction line control valve for a compressor which operates as part of a fluid system, such as a refrigeration system, wherein compressed fluid in its gaseous phase is converted into a liquid phase by a compressor and condenser operating in series and then reconverted into the gaseous phase in an evaporator unit. In such a system, the operation of the control valve is such that during any system operation in which the compressor suction line pressure exceeds a predetermined value, the downstream sensing bellows actuator 32 will move in a direction which causes the pressure in the chambers 21 and 22 to equalize, thus permitting the spring 25 to close the butterfly valve and thereby limit the compressor inlet pressure. The compressor inlet pressure limiting function will unload the compressor for starting and will limit the power requirements during pull-down operations.

To prevent the evaporator pressure from falling below a minimum, the upstream sensing bellows actuator 31, at a predetermined evaporator pressure, will override the downstream sensing bellows actuator 32 and establish control. In so controlling, the upstream bellows actuator will move in a direction which will cause the pressures to equalize in the chambers 21 and 22, again permitting the spring 25 to modulate the butterfly valve toward the closed position, thereby establishing a minimum evaporator pressure.

More specifically, in this type of system the passage 11 upstream of the butterfly valve 12 is in communication with a conduit which leads from the discharge side of the evaporator unit, and the passage 11 downstream of the butterfly valve is in communication with the compressor inlet. The passage 29 which communicates with the chamber 22 adjacent the lower end of the piston 16 is in communication with any suitable, relatively high pressure source which, for present purposes, will be assumed to be the discharge pressure of the compressor. A relatively high but substantially constant pressure source will suffice in lieu of the discharge pressure of the compressor. When the system is operating within its normal range, the suction produced by the compressor in the passage 11 will maintain the pressure within the chamber 34 relatively low so that the bellows 32 will be fully expanded and the plunger 51 controlled thereby urged against the ball valve 40 to maintain the ball valve away from its valve seat 42. The relatively high pressure within the chamber 22 urges the piston actuator 16 upwardly against the compression spring 25. Inasmuch as the upper chamber 21 adjacent the piston actuator is in communication with the relatively low pressure within the chamber 34, there will be relatively little resistance to the upward movement of the piston actuator 16 except for the compression spring 25. In this upward position of the piston actuator 16, the butterfly valve will be open.

From this position of equilibrium, if the compressor suction line pressure increases above a predetermined value, the pressure within the chamber 34 will increase, compressing the bellows 32 and permitting the spring urged annular element 48 to move the ball valve to closed position, thus closing off the chamber 21 from the inlet side of the compressor. This action isolates the chamber 21 from the passage 11. With the ball valve 40 closed, the pressure in the chambers 21 and 22 will gradually equalize due to the flow through the restricted passage 16a in the piston, thus allowing the spring 25 to act against the butterfly valve 12 to close it. This, in turn, will limit the compressor inlet pressure. If the pressure suitably drops, the decrease in pressure will thereupon reduce the pressure in the chamber 34 and cause the bellows 32 to expand and move the ball valve 40 away from its valve seat, thereby restoring the butterfly valve 12 to open position.

During any operation of the system below the design point, such condition will manifest itself in a reduced pressure in the chamber 33, causing the bellows 31 to expand. The expansion of the bellows 31 moves the plunger 49 into engagement with the ball valve 40, thereby closing the valve. During this operation, the upstream bellows 31 overrides the action of the downstream bellows 32, which is possible due to the lost motion connection between the plunger 51 and the bellows actuator 32. This action has the same effect as the action previously described, namely, it isolates the chamber 21 from the passage 11, permitting the pressures in the chambers 21 and 22 to gradually equalize due to the flow permitted by the restricted passage 16a. When the pressures in the chambers 21 and 22 are substantially equal, the spring 25 will urge the piston 16 downwardly which, in turn, tends to close the butterfly valve 12 and thereby build up the pressure on the discharge side of the evaporator. As the pressure is built up, the bellows 31 will contract, moving the plunger 49 out of contact with the ball valve so that the position of equilibrium will eventually be restored.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

I claim:

1. A control valve assembly comprising means forming a passage for the flow of a fluid therethrough, a control valve interposed in said passage, a movable actuator connected to the valve for controlling the operation thereof, means defining chambers on opposite sides of said movable actuator, a restricted passage through said movable valve actuator to permit a fluid to seep slowly from the chamber at higher pressure to the chamber at lower pressure, means urging the valve actuator in a direction to close the valve, a passage establishing communication between a relatively high pressure source and one of said chambers adjacent the movable valve actuator, passage means for exhausting the fluid from the other chamber, the relatively high pressure in said chamber urging the valve actuator to overcome the effect of the means which normally urges the actuator in a direction to close the control valve, valve means for sealing the lower pressure chamber adjacent said valve actuator, and dual sensing means for influencing the operation of said valve means, said dual sensing means being operative to close said valve means in the event that the pressure in the main passage downstream of the control valve exceeds a predetermined value or in the event that the pressure in the main passage upstream of said control valve falls below a predetermined value, the closing of said valve means permitting the pressures on opposite sides of the valve actuator to equalize due to the flow through said restricted passage, thereby permitting the control valve to be urged toward closed position.

2. A control valve assembly comprising a housing defining a main passage therethrough for the flow of a fluid, a control valve interposed in said passage, a movable valve actuator connected to the valve for controlling the operation thereof, means defining chambers on opposite sides of said movable actuator, a restricted passage through said actuator to permit a fluid to flow slowly from the chamber at higher pressure to the chamber at lower pressure, a spring normally urging said actuator in a direction to close the valve, a passage establishing communication between a relatively high pressure source and the chamber at higher pressure, an exhaust passage establishing communication between the other of said chambers and the main passage, the relatively high pressure in said one chamber urging the actuator against the action of the spring to maintain said control valve in open position, a first bellows-type actuator in communication with said main passage downstream of the control valve, valve means for regulating the flow through said exhaust passage, said valve means controlled by the first bellows-type actuator so that in the event of a predetermined increase in the pressure in the main passage downstream of the control valve the first bellows-type actuator will operate to close the said valve means, thereby permitting the pressures in the chambers on opposite sides of the valve actuator to equalize due to the flow of fluid through said restricted passage, said equalization in the pressure on opposite sides of the valve actuator permitting the spring to urge the control valve to closed position, and a second bellows-type actuator in communication with said main passage upstream of said control valve and controlling the operation of said valve means, said second bellows-type actuator operating to close said valve means in the event of a predetermined decrease in the pressure in the main passage upstream of said control valve, thereby equalizing the pressures in the chambers on opposite sides of the valve actuator and permitting the spring to urge the control valve to closed position.

3. A control valve assembly as set forth in claim 2 including means controlled by said first bellows-type actuator and engageable with said valve means through which said first bellows-type actuator controls the operation of said valve means, and a yielding connection between said last mentioned means and the first bellows-type actuator, whereby the yielding connection enables the second bellows-type actuator to insure operation of said valve means.

4. A control valve assembly comprising means defining a main passage, an adjustable control valve within said main passage, a pressure controlled actuator for adjusting said control valve, means connecting the pressure controlled actuator with a source of fluid under pressure, an exhaust passage establishing communication between the pressure controlled actuator and the main passage, whereby the fluid which controls said pressure controlled actuator is conducted to said main passage, means for restricting the flow through said exhaust passage, a pilot valve downstream of said restricting means for regulating said flow through the exhaust passage, thereby controlling the operation of said pressure controlled actuator, and pressure sensing means responsive to a pressure above a predetermined value downstream of the control valve and to a pressure below a predetermined value upstream of the control valve to actuate the pilot valve, thereby changing the rate of flow of said fluid through the exhaust passage and regulating the pressure controlled actuator to adjust the control valve.

References Cited in the file of this patent

UNITED STATES PATENTS

| 2,158,068 | Grove | May 16, 1939 |
| 2,401,144 | Dube | May 28, 1946 |
| 2,638,107 | Teague | May 12, 1953 |
| 2,731,980 | Diefenderfer | Jan. 24, 1956 |
| 2,753,692 | Dickieson | July 10, 1956 |
| 2,858,700 | Rose | Nov. 4, 1958 |
| 2,923,316 | Paul | Feb. 2, 1960 |